(No Model.) 2 Sheets—Sheet 1.

E. THOMSON.
ALTERNATING CURRENT MOTOR DEVICE.

No. 363,186. Patented May 17, 1887.

WITNESSES:

INVENTOR
Elihu Thomson
BY
Townsend & MacArthur
ATTORNEYS

N. PETERS, Photo-Lithographer, Washington, D. C.

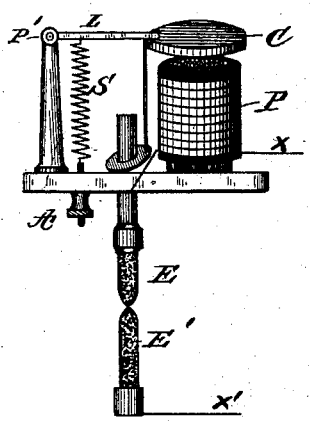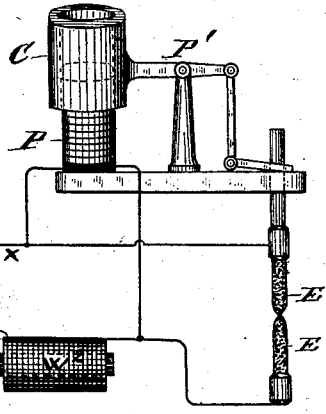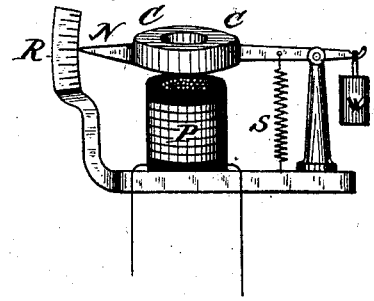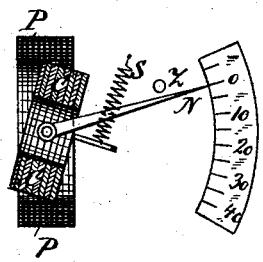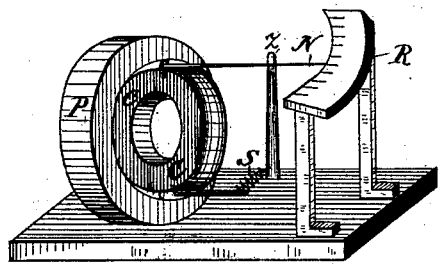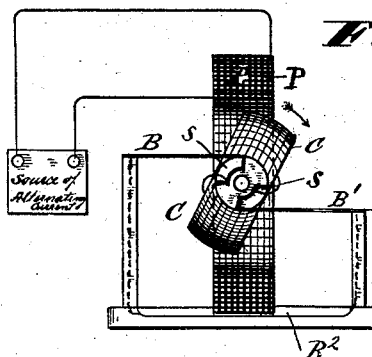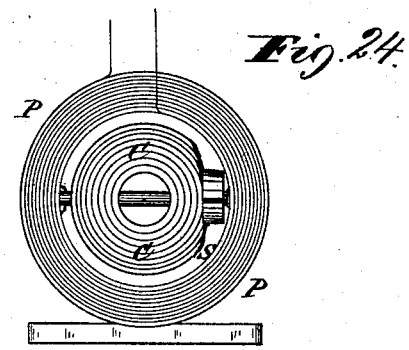

UNITED STATES PATENT OFFICE.

ELIHU THOMSON, OF LYNN, MASSACHUSETTS.

ALTERNATING-CURRENT MOTOR DEVICE.

SPECIFICATION forming part of Letters Patent No. 363,186, dated May 17, 1887.

Application filed January 26, 1887. Serial No. 225,607. (No model.)

*To all whom it may concern:*

Be it known that I, ELIHU THOMSON, a citizen of the United States, and a resident of Lynn, in the county of Essex and State of Massachusetts, have invented a certain new and useful Alternating-Current Motor Device, of which the following is a specification.

My invention relates to a means for producing motion by the agency of alternating electric currents or alternating magnetic fields.

I have discovered that, if a closed-circuit conductor of sufficiently low resistance and sufficient self-induction be placed in such relation to an alternating-current circuit or to an alternating magnetic field, alternating currents of considerable self-inductive power will be induced in said conductor, and if said conductor and the device, whether coil or magnet, acting inductively on the same, be properly mounted, so as to be movable, a continuous motion in the same direction may be produced similar to that produced by the attraction of a core or armature by the agency of a continuous current to the deflection of an iron needle by a continuous current, or to the continuous rotation of an armature-coil, as in the case of a continuous-current electric motor.

My invention may be carried out by the employment of an alternating-current coil acting directly to induce currents in the closed-circuit conductor; or said alternating-current coil may be utilized in producing rapid alternations of magnetic polarity in a mass of iron, which mass, or the alternating magnetic field produced by said mass, may act on the closed-circuit conductor in proper way to set up alternating currents in the latter, the resultant motive effect of which I find to be a tendency to continuous movement of the two parts with relation to one another, instead of a movement first in one and then in the other direction; or the alternations of magnetic state in the inductive field of the closed circuit might be produced in any other way instead of by a coil directly or a stationary core of iron, the only conditions being that the magnetic fields of alternately-opposite sign shall be of proper kind to set up strong induced currents in the closed conductor, and that the alternations shall be of sufficient rapidity to result in a considerable lapping of each induced current through self-induction upon the magnetic field by which the succeeding induced current is set up.

In the simplest form of my invention I employ a coil of wire carrying an alternating current and a closed-circuit conductor placed in proper relation to the coil to have alternating currents set up in it. I find that the effect of the alternating currents in the coil of wire is to cause a continuous strong repulsion of the closed circuit conductor, due to the self-induction of the induced currents and their consequent tendency to be prolonged beyond the point of change of the inducing agent.

In Figure 1 of the accompanying drawings I have illustrated one of the simplest embodiments of the invention. Figs. 2, 3, 4, 5, 6, 7, 8, and 9 illustrate other forms and constructions of apparatus embodying the same principle. Figs. 10, 11, 12, and 13 illustrate preferred forms of the part constituting the closed inductive circuit of my invention. Fig. 14 illustrates a modification of the apparatus shown in Fig. 2. Figs. 15, 16, and 17 illustrate modifications in which the movement of the parts takes place round an axis. Figs. 18, 19, 20, 21, and 22 illustrate various applications of my invention. Figs. 23 and 24 show a rotary electric motor embodying my invention.

Referring to Fig. 1, P indicates a coil of insulated wire arranged to be traversed by alternating currents of moderate rapidity. C indicates an outer cylinder or tube of good conducting material, such as copper. The conductor C or the coil P being mounted so as to be movable, it will be found that the passage of the alternating currents in P will cause a mutual repulsion in the directions indicated by the arrows. Such repulsion will be absent only when the center of C is exactly coincident with the center of P, so that there will be an equality of repulsive effects in both directions. The closed conductor or casing C may be made quite thick, so as to carry a very strong induced current. A vigorous thrust may then be obtained by the employment of strong alternating currents in the coil P.

The action is, I believe, due to the self-induction of the currents induced in the conductor C C, whereby such currents are continued beyond the point of change of intensity and polarity in the inducing alternating currents circulating in coil P, so that where attraction would result repulsion is produced, such repulsion occurring at and near the time of maximum currents in the coil P and conductor C, while whatever attractions occur exist near the zero of current in both C and P. If an iron core, I, of iron wires or sheet-iron, be added, as indicated in Fig. 2, the effects will be greatly intensified.

The conductors C P may be arranged in other relations to one another and the same result produced. Thus, as indicated in Fig. 3, the closed conductor C and the coil P may exchange positions, the conductor or cylinder C being within instead of without the inducing coil.

In the form shown in Fig. 4 the closed-circuit conductor C is made like a cap to fit over the coil P. It is important that a non-magnetic material or a very feebly magnetic one be used for the conductor C, and that such conductor have a high conducting capacity.

With the device shown in Fig. 4, mutual repulsion between the cap and the coil will be found to exist on the application of alternating currents to the coil P, and whichever part is made movable will be set into motion.

In the arrangements described it is quite apparent that the induced currents set up in the closed-circuit conductor result from the direct inductive action of the alternating currents in coil P, the alternating magnetic field existing around the coil P operating through induction to produce the alternating currents in the conductor C. The same result described may be effected by producing the proper kind of magnetic field in inductive relation to the conductor C through any desired means—as, for instance, by causing the coil P to excite a core or piece of iron, which shall be so arranged with relation to the conductor as to act virtually in the same manner that the coil P itself acts. Thus, as in Fig. 5, the copper ring C may be arranged to encircle the end of the core I on which the coil P acts. In this case the coil P acts also by direct induction on the conductor. Either the ring or coil being movable, the results before stated will be produced when alternating currents pass in the coil P. The same results may be produced by a round plate C, Fig. 6, laid parallel to a coil P.

In the device shown in Fig. 7 the induced currents are set up in the closed-circuit conductor through the inducing action of the magnetic field emanating from a mass of iron forming a core for an exciting-coil P carrying alternating currents. In this device a horseshoe-magnet of fine iron wire or strips of iron is employed and is wound with a coil P on each leg, through which coil the alternating current is passed. A copper ring or other closed conductor, C and C', located over each pole after the manner of an ordinary armature of iron, will be found to be repelled on the passage of alternating currents through the coils P and to exert a constant push away from the poles of the inducing-field.

The conductor C of Fig. 6 may be a square plate, as shown in Fig. 8, without changing the result.

In the form of my invention shown in Fig. 9 the magnet is a core of iron wound with a coil P, and the poles of the magnet are turned to face each other. A copper plate or ring C C, forming a closed conducting-circuit of induction-currents set up by the alternations of the magnetic field between the poles and placed as shown, will be thrown out of the space between said poles, as indicated, unless its axis is exactly coincident with the magnetic axis joining the poles. The two parts—to wit., the copper ring or other conductor and the alternating-current coil or alternating magnetic field induced, directly or indirectly, by said coil or by any other device which will serve to place the closed conductor under the influence of an inducing agent that will set up a current first in one and then in the other direction in the same—may be arranged with relation to one another as shown in Fig. 14, and the same effect before described will be produced. Thus, for instance, the copper ring C C of Fig. 14, if laid alongside the coil P and core I I so as to be movable, will, on the passage of alternating currents in P, persist in a tendency to move toward the center of the coil or in the direction indicated by the arrow, and will so move if free. It is preferable to construct the closed-circuit conductor C in all of the cases indicated herein so that it shall be a laminated structure composed of a number of conductors arranged around the same axis, but insulated from one another. This construction is readily attained by making the conductor of a number of copper washers or thin rings piled around the same axis and each insulated from its neighbors by interposed paper washers or by a coating of varnish. This construction is indicated in Figs. 10 and 11, showing forms of conductor C adapted to replace the forms of Figs. 1 and 6, respectively. The object in thus laminating or building up the conductor from a number of insulated separate conductors is to confine the induced currents to circular paths whose plane is at right angles to the axis. The same results may be obtained by the employment of a coil of copper wire or other good conductor, (indicated in Fig. 12 at C,) the ends of said coil being connected so as to form the closed-circuit conductor.

The short coil inclosing an iron-wire core, as indicated at $C^2$, Fig. 13, may be included in the circuit of the coil, thus giving increased self-induction to the induced currents set up in the coil or closed conductor C, and in some cases increasing the motive effects.

A motion of rotation may be obtained by the devices already described by mounting the inducing-coil or the coil or conductor in which the induced currents are excited on an axis, as indicated in Fig. 15, where the closed-circuit-conductor C C' is mounted on an axis. (Indicated at T.)

When alternating currents circulate in coil P, the conductor C will be deflected to a position at right angles to the plane of the coil P, as indicated by the dotted lines K K. The coil P might be used as a closed-circuit conductor and alternating currents passed through the coil C with a similar result.

In the modification indicated in Fig. 16 the closed-circuit conductor C, arranged within coil P, is supposed to be stationary, and the coil P, which carries the alternating currents and is located outside conductor C, is mounted so as to rotate in a plane transverse to the plane of the coil. A deflection of the coil P will result from the passage of alternating currents in such coil.

If the alternating-current coil and the closed-circuit conductor or coils or their current planes exactly coincide, they will remain at rest; but a very slight displacement will give rise to a deflection to one side or the other, which will be continued until the coils are at right angles to one another.

Rotation of the exciting-coil or of the closed-circuit conductor may be attained although said coil and conductor be not concentric. Thus, as indicated in Fig. 17, a closed-circuit conductor C, consisting, preferably, of a laminated ring and mounted before the coil P and core, as indicated, will, unless exactly in a plane parallel to the coil P, be turned to a position indicated by the dotted lines K, in which its plane is at right angles to that of coil P.

In Fig. 18 I have illustrated the application of my invention to an electric-arc lamp whose arc is maintained by alternating currents. Here the current on the circuit $x\ x'$ passes through the coils P and the electrodes E E', and the closed-circuit conductor C is mounted on a lever, L, which connects with a clamp or other device for lifting the upper carbon to form the arc. The lever L is pivoted at P', and a spring, S, normally tends to draw the lever down, so as to release the upper carbon-carrier from the clamp and permit the carbons to be in contact. When the alternating currents pass in coil P, the closed-circuit conductor C is repelled, thus lifting the upper carbon and forming the arc.

The coil P might be in derived circuit to the carbons, instead of in the arc-circuit. This modification is indicated in Fig. 19, where the coil P is supposed to be of finer wire, while the closed-circuit conductor, consisting of the copper tube C, is connected to a lever which is pivoted at P', and at its end opposite the tube connects with a lifting-clamp or other feed-regulating mechanism such as is ordinarily employed in electric-arc lamps for first separating the carbons to form the arc and then permitting them to feed according to the consumption.

The weight of the tube C normally lifts the upper carbon, but on passage of current the conductor C is repelled and the upper carbon is allowed to fall into contact with the lower, thus shunting the current largely from the coil P, whereupon the weight of the conductor C lifts the upper carbon and forms the arc. Thereafter the action of the lamp in feeding takes place in the ordinary way in accordance with the consumption and the attendant increase of effect in the operative circuit-coil. As thus arranged the devices might be used on an alternating-current circuit in series with other similar devices for regulating the arcs of electric lamps. If, however, the device, Fig. 19, were arranged in a branch circuit from mains supplying a number of other similar branches, such mains being of constant potential, or nearly so, it would be well to pass the current of the branch through the coil $W^2$, having considerable counter electro-motive force or reaction under the alternations of current.

My invention may be also applied to the construction of an indicator of current on an alternating-current circuit, as indicated in Fig. 20. The closed-circuit conductor C of that figure is mounted on a suitable movable support, as indicated, which carries a pointer or index, N, moving over a scale, R. A spring, S, or a weight, W, adjustable, if desired, may be employed to regulate the effects on the closed-circuit conductor C of the alternations in coil P.

Fig. 21 illustrates a current-indicator made by mounting the closed-circuit conductor on an axis that is diametric to the exciting-coil and attaching to the movable conductor an index, N. A spring, S, is applied to throw the conductor C, when unaffected, into a plane nearly parallel with that of the coil P.

Fig. 22 shows in plan and section the devices of Fig. 21 with a stop pin or rod, Z, arranged to limit the movement of the devices under the action of the spring S.

Figure 1:
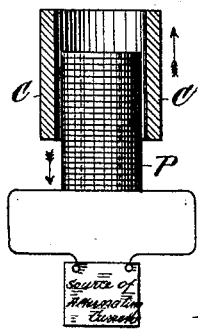
Figure 2:
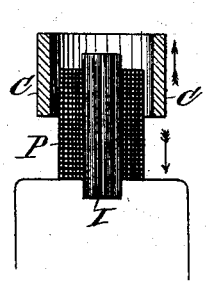
Figure 3:
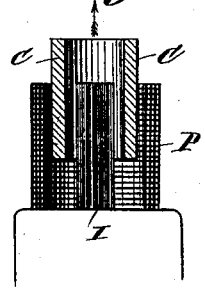
Figure 4:
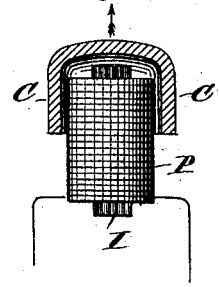
Figure 5:
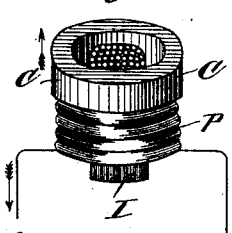
Figure 6:
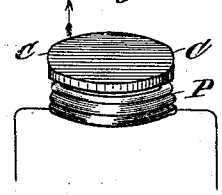
Figure 7:
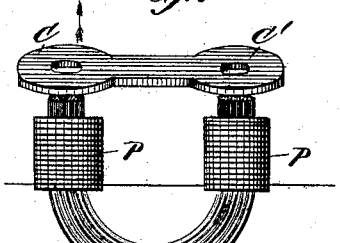
Figure 8:
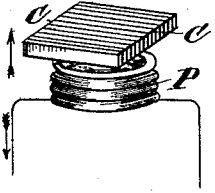
Figure 9:
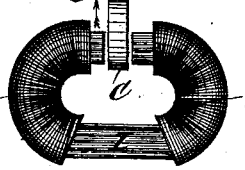
Figure 10:
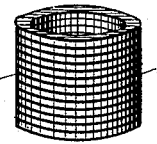
Figure 11:
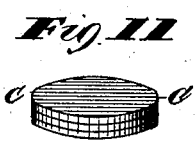
Figure 12:
Figure 13:
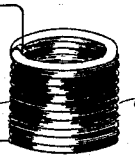
Figure 14:
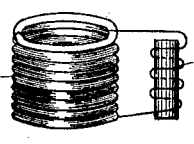
Figure 15:
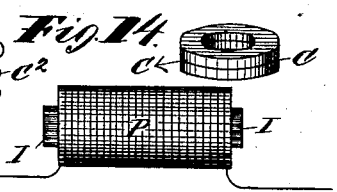
Figure 15:
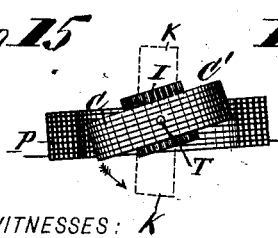
Figure 16:
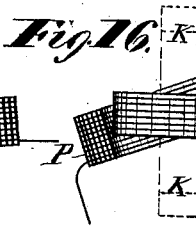
Figure 17:
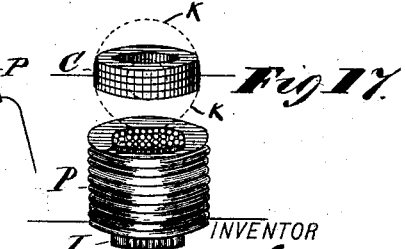

Figs. 23 and 24 illustrate the manner in which my invention may be employed in the construction of a rotary electric motor. The coil P, traversed by the alternating currents, produces the alternating magnet-field, which acts on the closed-circuit conductor C, mounted on an axis transverse to the plane of coil P. The conductor C may be made after the manner hereinbefore explained. It is herein shown as made of a coil of insulated wire whose terminals are connected to the opposite plates S S of a commutator ring or cylinder upon which bear brushes B B', electrically connected together. The brushes B B' are applied so as to close the circuit of the conductor C when it is turned slightly beyond the plane of coincidence with coil P and to maintain the closure of circuit-coil until the conductor C has passed out of the influence of the coil P—that is to say, when the conductor has passed to a position nearly at right angles to the coil P. The circuit is then broken until the conductor has moved on by momentum into plane with the coil P, when the circuit of the conductor is again established, and by the repulsive effects already described the conductor makes another half-revolution. By this means continuous rotation of the conductor may be produced without any commutation of the alternating currents.

I do not make any claim herein to the application of my invention to electric motors in which a continuous movement is attained by the operation of a circuit controller or commutator, as this forms the subject of a separate application for patent filed of even date herewith.

What I claim as my invention is—

1. An electromotor device for producing continuous movement in the same direction, consisting, essentially, of a closed-circuit conductor such as described and an inductive agent of alternately opposite polarity acting on said conductor, said conductor and inducing agent, one or both, being movable, as and for the purpose set forth.

2. An electromotor device consisting, essentially, of an endless conductor of copper or other diamagnetic material, as described, and an inductor acting on the same in the manner described to set up rapid induced alternations of current, whereby a continuous repulsion and consequent movement of the parts away from one another may be produced.

3. An electromotor device consisting, essentially, of a means for producing rapid alternations of electric or magnetic polarity and a closed-circuit conductor arranged in inductive relation to the same and adapted, as described, to carry induced currents whose self-induction will cause them to be carried over to the phase of active repulsion by the inductor.

4. An electromotor device consisting, essentially, of a coil carrying an alternating electric current, a closed-circuit conductor arranged within the inductive influence of the magnetic field excited by said alternations, and an iron core for said exciting-coil.

5. The combination, with an alternating-current conductor, of a laminated or subdivided closed-circuit conductor of high conductivity and self-induction arranged in inductive relation to the magnetic field excited by the conductor carrying the alternating current, one or both of said conductors being properly mounted to move with relation to one another under the repulsive action produced through the alternating and induced currents.

6. The combination, with the alternating-current conductor, of the closed-circuit conductor in inductive relation to the first and made up of a number of superposed plates insulated from one another, said closed-circuit conductor being of high conductivity and self-induction, as described, and one or both of said conductors being suitably mounted, so that they may move under the repellent action established by the alternating current.

7. The combination, with an alternating-current conductor and a closed-circuit conductor of good conductivity and self-induction arranged in inductive relation to the magnetic field produced by the former, of an index or pointer carried by one or the other element of the combination, and a scale over which said pointer may move to indicate the repulsive action existing on the passage of the alternating current.

Signed at Lynn, in the county of Essex and State of Massachusetts, this 21st day of January, A. D. 1887.

ELIHU THOMSON.

Witnesses:
A. L. ROHRER,
J. W. GIBBONEY.